United States Patent [19]

Doll

[11] 4,242,712

[45] * Dec. 30, 1980

[54] OVER-POWER SAFETY DEVICE FOR MOTOR DRIVEN SYSTEM

[75] Inventor: Joseph D. Doll, Gering, Nebr.

[73] Assignee: Lockwood Corporation, Gering, Nebr.

[ * ] Notice: The portion of the term of this patent subsequent to Feb. 6, 1996, has been disclaimed.

[21] Appl. No.: 950,837

[22] Filed: Oct. 12, 1978

Related U.S. Application Data

[63] Continuation of Ser. No. 789,890, Apr. 22, 1977, Pat. No. 4,138,705.

[51] Int. Cl.² .............................................. H02H 9/04
[52] U.S. Cl. ..................................... 361/42; 239/177; 361/104
[58] Field of Search ................................... 361/42–49, 361/50, 90, 91, 104; 239/177, 212, DIG. 15

[56] References Cited

U.S. PATENT DOCUMENTS

| | | | |
|---|---|---|---|
| 1,832,292 | 11/1931 | Fowler | 361/42 |
| 2,832,916 | 4/1958 | Kennedy | 361/20 |
| 3,234,316 | 2/1966 | Mathews | 13/24 |
| 3,243,657 | 3/1966 | Towles | 361/50 |
| 3,386,004 | 5/1968 | Dwyer | 361/50 |
| 3,515,941 | 6/1970 | Moore et al. | 361/49 |
| 3,631,321 | 12/1971 | Eisenstadt | 361/120 |
| 3,665,252 | 5/1972 | Rogers et al. | 361/50 |
| 3,754,221 | 8/1973 | Stelter | 340/255 |
| 3,766,435 | 10/1973 | Childers | 361/42 |
| 3,786,466 | 1/1974 | Naito et al. | 340/255 |
| 3,831,160 | 8/1974 | Cronin et al. | 340/256 |
| 3,886,409 | 5/1975 | Scarpino | 361/48 |
| 3,891,894 | 6/1975 | Scarpino | 361/49 |

*Primary Examiner*—Harry E. Moose, Jr.
*Attorney, Agent, or Firm*—Arnold, White & Durkee

[57] ABSTRACT

A safety device and method for detecting over-power conditions on the chassis of a motor driven system interrupts energization of the system when the voltage differential between the system chassis and earth ground exceeds a selected value. The device is especially beneficial for systems utilizing multi-phase induction motors in which current sensing safety devices cannot effectively detect all over-power conditions. The safety device utilizes a fuse and a motor control relay such that, upon the occurrence of the over-power condition, the fuse is rendered non-conductive, opening the motor control relay.

1 Claim, 2 Drawing Figures

OVER-POWER SAFETY DEVICE FOR MOTOR DRIVEN SYSTEM

This is a continuation of application, Ser. No. 789,890, filed April 22, 1977, now U.S. Pat. No. 4,138,705.

BACKGROUND OF THE INVENTION

The present invention relates generally to safety devices for detecting over-power conditions in motor driven systems, and more particularly relates to such safety devices and methods for use in irrigation systems utilizing multi-phase induction motors.

Many systems utilize heavy duty motors. The motors may be utilized for running sub-systems or for transporting the system itself. For example, grain drying machinery and oil field drilling equipment are systems of the first type, and center pivot irrigation systems are systems of the latter type. In both types of systems requiring the heavy duty motors, occurrences of large amounts of current for operating the motors is unavoidable, necessitating utmost safety precautions. For example, during start-up of the motors, extraordinarily high magnitudes of current are encountered. During normal operation of the motors, lesser amounts of current drawn than during start-up, but even such lesser amounts may be hazardous. This is especially so if a malfunction should occur, such as a short circuit in the system. Such a short circuit usually results in high values of current being directed into the chassis of the system.

Short circuit malfunctions have long been recognized as hazardous, and attempts have been made to monitor such malfunctions using ground fault indicators (GFI). GFI's have conventionally been designed to monitor current going into the system on a given line versus current coming out of the system on the line. The value of the measured differential is indicative of a potentially dangerous ground fault. Although such current measuring systems have generally been satisfactory for detection malfunctions in single phase motor systems, multi-phase systems have posed problems because of the nature of three phase systems and the functional relationships among the phases.

In multi-phase systems, for example, a fault usually creates an imbalance of voltages between the phases. There is no simple current path between the phases for monitoring according to conventional GFI techniques. Further, the voltage imbalance tends to produce a voltage differential between the ground wire and chassis and may provide a hazardous voltage without the attendant current drain. Accordingly, current sensing schemes are inadequate to detect all fault situations in multi-phase systems.

Further, because of the high inrush of current upon starting, such motor driven systems are unsuited for simple fusing techniques. For example, because of the initial high inrush of current, the fuse either must be of a sufficiently high value to withstand the high inrush, and thereby allowing a lesser standard of safety, or it must be protected during starting of the motors. However, even when protected, the value selected for the fuse is usually of a magnitude which eliminates nuisance shutdowns. For example, in center pivot irrigation systems, the heavy duty motors which rotate the irrigation system encounter differing terrain conditions, calling for differing amounts of torque. This varying torque characteristic causes a corresponding variance in the amount of current drawn by the motors. Unless the value of the fuse is selected at a sufficiently high value to account for extreme operating current requirements, the system often becomes unacceptably shut down during normal operations. On the other hand, if the fuse value is selected to avoid such nuisance shutdowns, the lesser standard of protection is provided.

SUMMARY OF THE INVENTION

The above described shortcomings of the prior art are overcome by providing a safety device and method which detects over-power conditions on the chassis of a motor driven system and interrupts energization of the system upon the voltage differential between the chassis and earth ground exceeding a selected value. Voltage differentials as low as 10 to 12 VAC can be detected without encountering the possibility of nuisance shutdowns, and the response time of the safety device is on the order of 30 milliseconds. The device is simply designed and requires only minimal changes to existing systems for retrofitting.

According to a preferred embodiment, a switch mechanism, preferably including a relay, is responsive to a control signal for alternately conducting and interrupting energization to one or more motors of the system. A signal generator is coupled to the chassis for generating the control signal when the voltage between the chassis and earth ground exceeds the selected value. The signal generator includes a rectifier having its input terminal coupled to receive AC system voltage and having its output terminal coupled to the relay. Another input terminal of the rectifier is coupled to the chassis for referencing the value of the rectified signal, i.e. the control signal, to the voltage on the chassis.

In addition to the relay, the switch mechanism includes a normally closed, current actuated element which becomes electrically nonconductive upon passage therethrough of current reaching a predetermined value. The coil of the relay and the current actuated element are coupled in series, and this series connection is in turn serially connected to earth ground. Preferably, the current actuated element is a fuse.

As an added feature of the invention, a source of DC power is coupled to the relay switch for maintaining the relay in the conductive state upon AC power failure.

The safety device is especially effective in systems utilizing multi-phase induction motors, such as in motor driven irrigation systems, agricultural grain drying systems, and oilfield drilling operations. A specific example on which the safety device is outstandingly employed is in association with a center pivot irrigation system for delivering large volumes of water to agricultural areas.

According to the method of the invention, detection of over-power conditions in a motor driven system having a control line which controls energization of one or more motors in a system is achieved by: generating a control system having a value indicative of the voltage difference between earth ground and the chassis of the system; rendering non-conductive a first, current sensing switch when the control signal exceeds the selected value; and rendering non-conductive a second switch coupled to the control line in response to the non-conduction of the first switch, thereby effecting de-energization of the one or more motors. The step of generating the control signal preferably includes the step of rectifying an AC voltage to provide a rectified signal having a value which is referenced to the value of the voltage on the system. The method also preferably includes the step of making first and second spaced electrical connections to earth ground. In the case of a center pivot irrigation system, both spaced connections are made in the vicinity of the center of pivot of the system. The first connection is to the chassis of the system, and the second connection is to the safety device.

As a feature of the inventive method, DC power is maintained to the second switch for maintaining it conductive in the event of AC power failure due to the imposition of DC voltage.

Accordingly, it is a general object of the present invention to provide a new and improved safety device and method for providing over-voltage protection to motor driven systems.

The above noted and other objects and advantages will become more apparent from a detailed reading of the specification in conjunction with the following drawings wherein:

DESCRIPTION OF A PREFERRED EMBODIMENT

Figure 1:
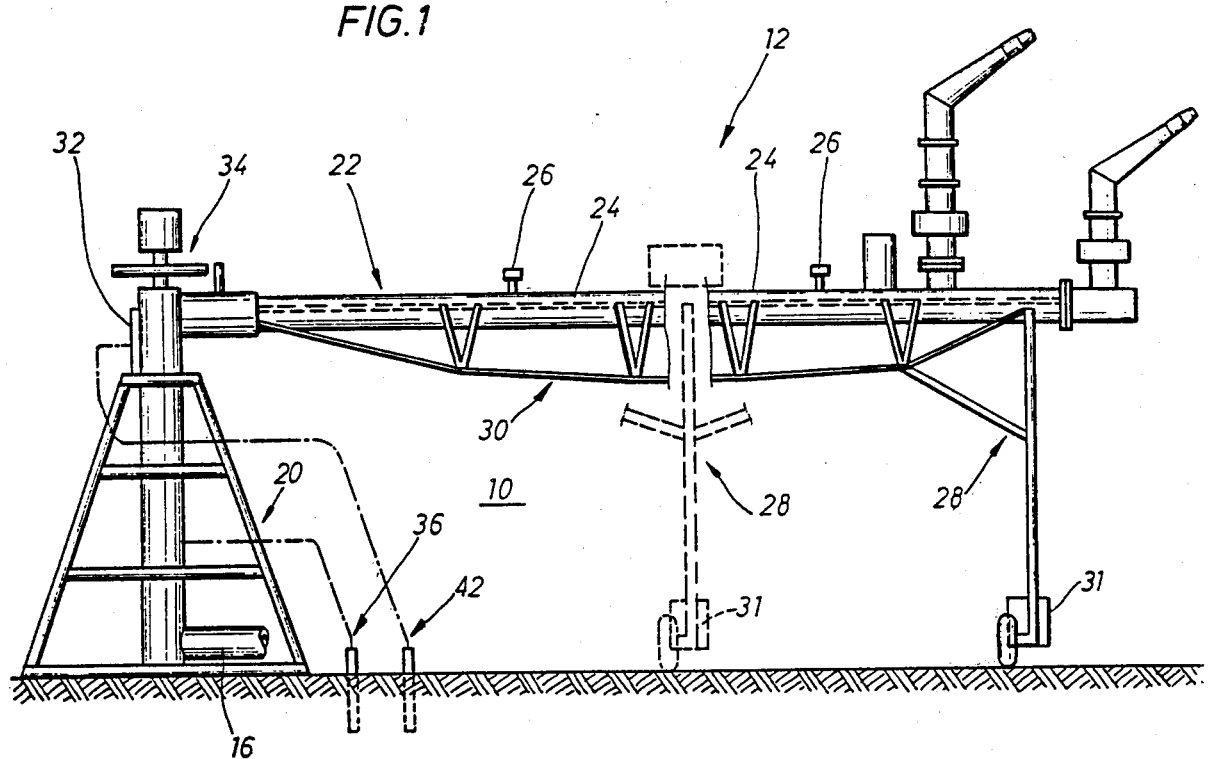
FIG. 1 is a schematic side view of a center pivot irrigation system on which the over-voltage sensing device may be utilized.

Refer now to FIG. 1, a motor driven system, taking the form of a center pivot irrigation system 10, features a safety device for detecting over-power conditions on the system. The safety device detects any voltage differential between the chassis of the system 10 and earth ground, and de-energizes the system 10 upon the voltage differential exceeding a selected value.

The system 10 includes a main pipeline sprinkler 12 which is coupled to a water supply 16 at a center pivot point for irrigating a central, generally circular area about the pivot point. A pivot stand assembly 20 is coupled to the water supply, and a long boom 22 is pivotally connected to the pivot stand 20. The boom 22 includes a plurality of sections of pipe 24 which are connected end to end to provide a length ranging from several hundred feet to, for example, more than 1500 feet. The pipe 24 is directly connected to the water supply 16 and is of a sufficient inside diameter to convey water therefrom at a rate of over 1200 gallons per minute.

The boom 22 carries a plurality of primary fluid dispensing nozzles 26 disposed at spaced intervals along the sections of interconnected pipe 24. Some thirteen towers may be provided with a spacing between towers preferably of approximately 125 feet. The boom 22 also carries diaphragm type hydraulic valves (not shown) coupled in fluid passing communication between the pipe 24 and the primary nozzles 26. Additionally a control tube (not shown) for the hydraulic valves is carried by the boom 22. The control tube is connected to all the hydraulic valves for controlling operation of all the primary nozzles 26. Pressure to the control tube is controlled by a pair of feed/bleed valves (not shown).

When pressure within the control tube is bled to atmosphere, the hydraulic valves open, allowing discharge of the irrigating fluid (i.e. water) through the primary nozzles 26. Conversely, pressure, i.e., water pressure, within the control tube above a threshold valve, renders the valves into a closed condition, preventing discharge through the nozzles 26.

The sections of pipe 24 are supported by a plurality of motor driven towers 28 disposed at the intersections of the sections of pipe 24 and by pipe supporting trusses 30 connecting adjacent towers 28. A supporting truss also connects the first tower to the pivot stand assembly 20. The towers 28 and the trusses are constructed and arranged to provide a ground clearance of approximately nine feet with a minimum of wind resistance. Each of the towers 28 carries a set of wheels and a tower motor 31 for driving its wheels and thereby effecting pivoting or rotation of the boom 22 about the pivot stand assembly 20.

A control system 32 controls energization of the end tower motor to rotate the boom 22 about the pivot stand assembly at operator specified pivotal or rotational rates. An alignment system is provided (not shown) for operating the remainder of the tower motors to maintain the sections of pipe 24 in alignment. The alignment system employs a tension wire stretched along the boom and employs mechanical linkage responsive to movements in the tension wire to actuate microswitches for respective tower motors. Actuation of the microswitches energizes the appropriate tower motor to bring the sections of pipe into alignment.

The control system 32 includes an angle sensor 34 for providing signals in response to and indicative of the rotational position of the boom 22 about the stand assembly 20. One embodiment of the angle sensor 34 utilizes cam operated switches. The cam rotates according to the pivotal movement of the boom 22 and has lobes which actuate the switches to generate signals representative of the orientation of the boom 22 about the pivot stand assembly 20.

The main pipeline sprinkler system 12 as described is generally well-known in the art, and its operation is well understood. For example, the model 2200 Center Pivot Irrigation System marketed by Lockwood Corporation, Gering, Nebraska, is generally of this construction and is readily modified, for example, to include the control tube and hydraulic valves as above described. Accordingly, the main pipeline sprinkler system 12, its alignment system, and its control system 32 are not described in great detail.

As part of the control system 32, a first connection to earth ground, incicated schematically by the numeral 36, is achieved by driving a stake into the ground and connecting the stake to the chassis of the system 10. The connection 36 is a safety connection which attempts to maintain the chassis at substantially zero volts above earth ground.

Figure 2:
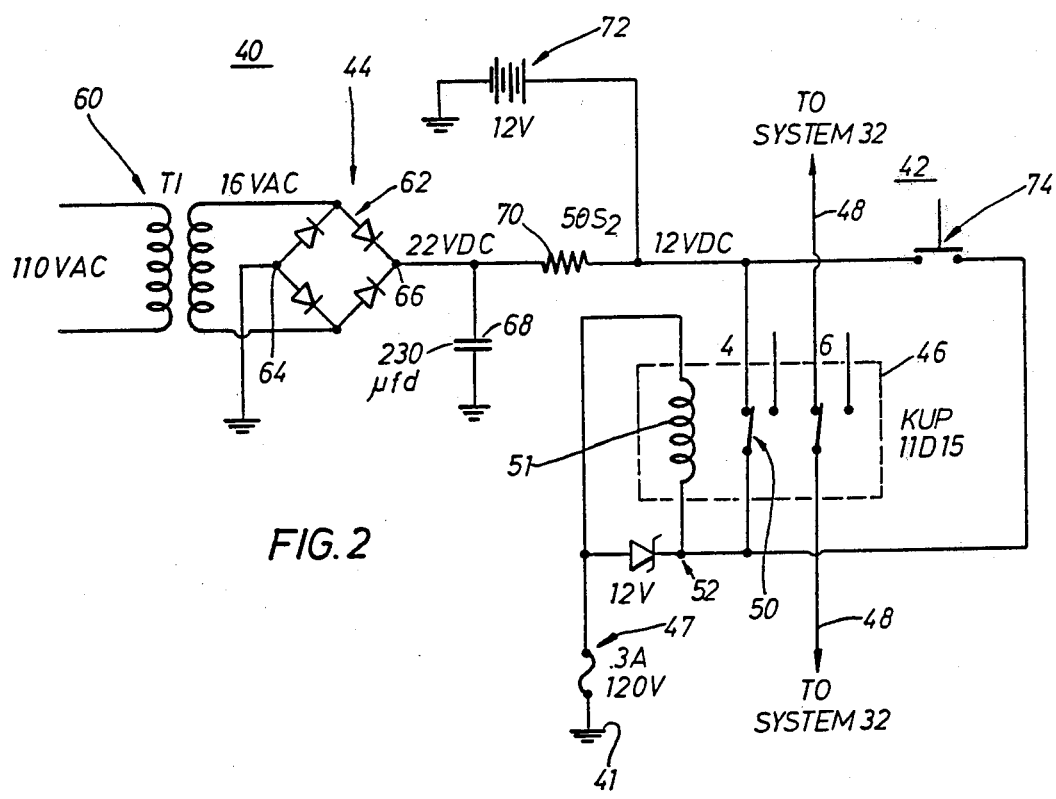
FIG. 2 is a circuit schematic of a preferred embodiment of the sensing device.

Since, however, operation of the system 10 may impose considerable values of voltage upon the cassis, notwithstanding the connection 36, the control system 32 further includes a voltage actuated safety device 40 (see FIG. 2). The safety device 40 is referenced to earth ground by a second connection 41, in the form of another stake driven into the ground, which is spaced from the first connection 36. As shown in FIG. 1, for center pivot irrigation system, both connections 36, 41 are spaced about the center of pivot of the system 10.

Because malfunctions and other conditions encountered during operation of the system 10 can cause the chassis of the system 10 to develop a voltage above ground potential, the connection 41 provides an accurate indication of earth ground for measuring the differential voltage between the chassis and earth ground.

When the safety device 40 senses that this differential voltage exceeds a selected value, it effects the de-energization of the motors 31. The device 40 is designed to detect voltage differentials on the order of 10-12 VAC and to respond in a time interval on the order of 30 milliseconds.

The safety device 40 includes a switch mechanism 42 which is responsive to a control signal for alternately controlling energization and de-energization of the motors 31, and includes a signal generator 44 for generating the control signal having an amplitude indicative of the difference between chassis voltage and earth ground.

The switch 42 includes a relay 46 and a current sensing element 47. The relay 46 is coupled to receive the control signal from the signal generator 44, and the current sensing element 47 couples the relay 46 to earth ground via the connection 42.

The relay 46 has its primary contacts serially connected in a control line 48. The control line 48 controls energization and de-energization of the motors 31 via the control system 32. The control line 48 may be utilized in the control system disclosed and claimed in co-pending application entitled "Center Pivot Irrigation System having Apparatus for Irrigating Corners", filed Mar. 17, 1977, Ser. No. 778,470 and assigned to the assignee of the present invention. This copending application is specifically incorporated by reference for its showing of a system 10 which may utilize such a safety device 40.

The relay 46 has secondary contacts 50 which are coupled to the signal generator 44 and to circuit ground via the connection 41. The relay 46 has a coil 51 and coil contacts 52. The contacts 52 are serially connected to the secondary contacts 50 and are coupled to each ground via the connection 41. A zener diode 54 is connected across the coil contacts 52 for maintaining a prescribed voltage across the relay coil 51.

When the safety device 40 is used on an irrigation system, the current sensing element 47 is preferably a fuse. Other current sensing elements, such as circuit breakers may be suitably employed depending upon the type of system 10.

The signal generator 44 in the preferred and illustrated embodiment includes a step down transformer 60 which is coupled to receive AC system voltage and to provide a stepped-down control voltage at its output terminal. A rectifier 62 taking the form of a diode bridge, is coupled to the output terminals of the transformer 60 for rectifying the stepped down control voltage. Another input terminal 64 to the rectifier 62 is connected to the chassis of the system 10 so that the rectified voltage on the output terminal 66 is referenced to the voltage developed on the chassis of the system 10.

A filter capacitor 68 couples the output terminal 66 to chassis ground for filtering the rectified output voltage from the rectifier 62. A resistor 70 couples the output terminal 66 to the secondary contacts 50 of the relay 46 for applying the appropriate voltage level to the relay 46.

As a feature of the present invention, a DC voltage source 72 is optionally coupled to the secondary contacts 50 for maintaining a voltage on the relay 46 upon AC system voltage failure. Without the DC voltage source 72, and AC voltage failure would cause the relay 46 to de-energize, requiring resetting.

To reset the relay 46, a manually actuated reset switch 74 is provided. The reset switch 74 is normally open and is connected across the secondary contacts 50 for energizing the coil 51 and thereby closing the contacts 50.

In operation, the AC device 40 detects over-power conditions as follows. The rectifier 62 provides a sustaining voltage to the relay 46, maintaining the relay 46 conductive during normal operating conditions. This maintains a completed circuit along the control line 48 for maintaining energization to the system 10. The rectified voltage applied to the relay 46 is referenced to the chassis voltage via the input terminal 64 so that, when faults or other conditions cause the chassis voltage to increase, the rectified voltage at terminal 66 increases. As this voltage increases, increased current is caused to flow through the relay 46 and through the fuse 47. When a selected value of chassis voltage is reached, as determined by the rating on the fuse 47 and by the characteristics of the relay 46, the fuse 47 opens. Opening of the fuse 47 causes removal of the sustaining voltage across the coil 51, causing the primary contacts to open and to provide an open circuit in the control line 48. Accordingly, when a voltage differential between the chassis of the system 10 and earth ground exceeds a selected value, energization to the system 10 is caused to be discontinued. The de-energization is within a period of approximately 30 milliseconds.

It will thus be appreciated that a new and improved safety device and method for protecting motorized systems from over-voltage conditions has been described. By detecting the voltage differential between the chassis and earth ground, potentially dangerous conditions can be identified which are otherwise difficult to identify using conventional current sensing techniques. By sensing voltage rather than current, effective protection is obtained without encountering nuisance shutdowns. The safety device is especially adapted for use with multi-phase AC induction motors, such as are utilized in center pivot irrigation systems.

Although a rather detailed description of a single preferred embodiment has been described it is understood that such a description has been by way of example only. Numerous changes in the design of the safety device and numerous other applications will be apparent to those of ordinary skill in the art without departing from the spirit and scope of the invention as hereinafter claimed.

What is claimed is:

1. A safety device for detecting a fault condition on a chassis of a motor driven system and for interrupting operation of the system upon the occurrence of said condition, said system having means responsive to a control signal for selectively deenergizing the system, said safety device comprising:
   a. a first connection to earth ground;
   b. a second connection to earth ground spaced from said first connection;
   c. a connector between said first connection and said chassis of said system; and
   d. a signal generator connected to said second connection and to said chassis for generating the control signal when the voltage between the chassis and the second connection exceeds a selected value.

* * * * *